United States Patent [19]

Wada et al.

[11] Patent Number: 4,692,000
[45] Date of Patent: Sep. 8, 1987

[54] MOTOR-DRIVEN COLLAPSIBLE DOOR MIRROR

[75] Inventors: Yasuto Wada, Machida; Yoshihiko Ishiyama, Isehara; Makoto Yamashita, Ayase, all of Japan

[73] Assignee: Ichikoh Industries, Ltd., Tokyo, Japan

[21] Appl. No.: 796,697

[22] Filed: Nov. 12, 1985

[30] Foreign Application Priority Data

| Nov. 12, 1984 | [JP] | Japan | 59-236594 |
| Jan. 14, 1985 | [JP] | Japan | 60-3097[U] |
| Jan. 29, 1985 | [JP] | Japan | 60-9998[U] |
| Aug. 26, 1985 | [JP] | Japan | 60-129833[U] |
| Aug. 26, 1985 | [JP] | Japan | 60-129834[U] |
| Aug. 26, 1985 | [JP] | Japan | 60-129835[U] |

[51] Int. Cl.⁴ .................... B60R 1/06; G02B 7/18
[52] U.S. Cl. ........................... 350/637; 350/604; 248/478; 248/900
[58] Field of Search ............ 350/604, 637; 248/478, 248/549, 900

[56] References Cited

U.S. PATENT DOCUMENTS

| 2,871,761 | 2/1959 | Snyder | 350/637 |
| 3,005,384 | 10/1961 | Baird et al. | 350/637 |
| 3,008,375 | 11/1961 | Henderson | 350/637 |
| 3,429,639 | 2/1969 | Peters | 350/637 |
| 4,456,333 | 6/1984 | Hewitt | 350/637 |
| 4,464,016 | 8/1984 | Weber et al. | 350/637 |

FOREIGN PATENT DOCUMENTS

| 145041 | 11/1980 | Japan | 350/604 |
| 4440 | 1/1982 | Japan | 350/604 |

Primary Examiner—Jon W. Henry
Attorney, Agent, or Firm—Schwartz, Jeffery, Schwaab, Mack, Blumenthal & Evans

[57] ABSTRACT

A mirror housing for holding a mirror is automatically swung and collapsed by remote operation in the car. The mirror housing supported by a base is swung round a fixed shaft and shifted to a predetermined position by a drive mechanism which includes a drive motor, speed reducer mechanism and the like.

12 Claims, 11 Drawing Figures

4,692,000

MOTOR-DRIVEN COLLAPSIBLE DOOR MIRROR

BACKGROUND OF THE INVENTION (1) Field of the Invention

The present invention relates to a door mirror for use with cars and, more particularly, it relates to a motor-driven collapsible door mirror whose mirror housing projected from the outer surface of a car body can be automatically swung and collapsed along the outer surface of the car body when it is operated inside the car.

(2) Prior Art

As shown in FIG. 10, the car door mirror is usually projected by a distance l from the outermost surface of the car body. The door mirror D is of the plane mirror type and it is located near his visual point of the driver. It is therefore needed that the mirror is made large-sized for the purpose of obtaining a sight area large enough as compared with the fender mirror which is of the convex mirror type. The mirror housing in which the door mirror is housed is thus made large-sized and as the result, the door mirror D is projected from the outermost surface of the car body.

When the door mirror D is projected like this, however, the projected portion of the door mirror has touched matters and persons outside, thereby causing unexpected accidents.

Further, it is needed that the capacity for carrying the cars is increased only by their projected mirror portions when they are transported, thereby making their transportation cost high. In addition, their projected mirror portions make it troublesome for them to be garaged.

In order to eliminate these drawbacks, there has been provided a door mirror of the buffer type which is provided with such a holder mechanism as disclosed by a Japanese Utility Model Application (Disclosure No. 58-33339), for example. This door mirror comprises a mirror housing connected to a base by a hinge plate, and two coil springs for holding and urging the mirror housing to the base. When an impact is added to the door mirror, the mirror housing is swung against the coil springs in the direction in which the impact is added, thereby buffering the impact.

When the car is transported or garaged, the mirror housing is manually and forcedly swung against the coil springs to form a clearance between the mirror housing and the base, in which the holder mechanism is interposed to hold the mirror housing swung toward the base or collapsed along the outer side surface of the car.

In the case of this prior art, however, the mirror must be swung by hand and outside the car. When the mirror is to be swung many times on a rainy day, for example, the driver feels troublesome and sick of it. In addition, the holder mechanism is needed as an independent means, thereby making it difficult to control the parts.

SUMMARY OF THE INVENTION

A motor-driven collapsible door mirror according to the present invention is intended to swing the mirror housing round a shaft which is fixed to the outer side of a door of the car, and a drive mechanism which includes a drive motor, speed reducer and the like connected one another in series to swing the mirror housing is located compact at the side of the fixed shaft and supported by the mirror housing. When sun-and-planet gear engaged with a fixed gear is rotated by the drive motor, the mirror housing and the like are swung round the fixed shaft.

The position to which the mirror housing is swung is detected by a switch mechanism and the drive motor is controlled responsive to a detection signal applied from the switch mechanism. The mirror housing can be thus accurately and easily swung to a predetermined position.

The mirror housing which has been swung to the predetermined position is elastically limited in position by a limiter mechanism and can be thus reliably held at this predetermined position.

When an excessive force is added from outside to the mirror housing, an overload absorber means in the power transmission system for the drive motor is made operative to shut off the mirror housing from the drive motor, thereby leaving the mirror housing freely swingable. The drive system can be thus prevented from being broken and the door mirror can be manually operated.

An object of the present invention is therefore to provide an improved motor-driven collapsible door mirror whose mirror housing can be freely swung by the remote control in the car.

Another object of the present invention is to provide a motor-driven collapsible door mirror wherein the mechanism for swinging the mirror housing can be assembled suitable and compact in relation to the swinging center of the mirror housing and wherein the mirror housing can be stably swung.

A further object of the present invention is to provide a motor-driven collapsible door mirror having buffer function against any force added from outside to the mirror housing and capable of manually operating the mirror housing.

A still further object of the present invention is to provide a motor-driven collapsible door mirror wherein the mirror housing can be appropriately set to any swung position without depending upon driver's judgment.

A still further object of the present invention is to provide a motor-driven collapsible door mirror wherein the mirror housing which has been swung can be reliably held at that position.

These and other objects as well as merits of the present invention will become apparent from the following detailed description with reference to the accompanying drawings.

DETAILED DESCRIPTION OF THE PREFERRED EMBODIMENT

Figure 1:
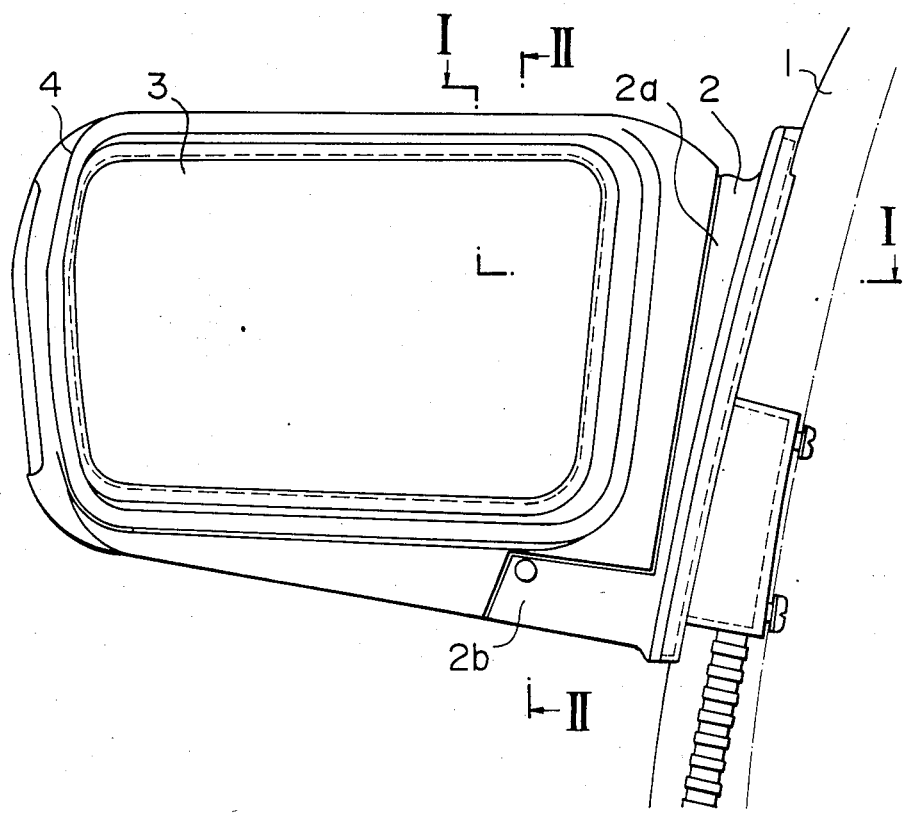
FIG. 1 is a front view showing an example of the motor-driven collapsible door mirror according to the present invention.

An example of the motor-driven collapsible door mirror according to the present invention includes a base 2 located on the side of a door 1, and a mirror housing 4 attached to the base 2 to hold a mirror 3, as shown in FIG. 1. The mirror housing 4 can be swung in horizontal direction by means of a drive mechanism.

Figure 2:
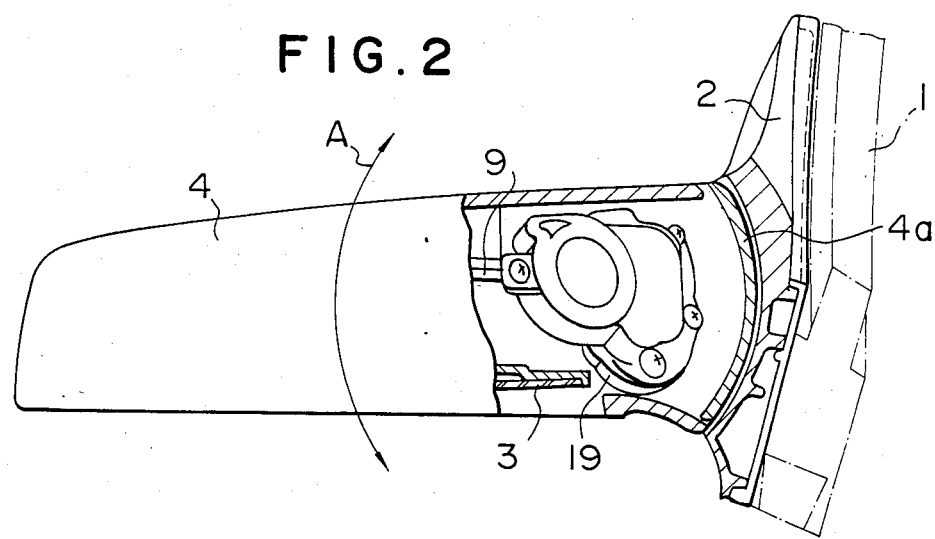
FIG. 2 is a sectional view taken along a line II—II in FIG. 1.

The base 2 is of substantially L-shape comprising a vertical portion 2a arranged along the side of the door 1 and a horizontal portion 2b continuous from the lower end of the vertical portion 2a and projected sideward the door 1. The mirror housing 4 is mounted on the horizontal portion 2b of the base 2. That side of the vertical portion 2a which faces the mirror housing 4 is curved, taking the swing shaft of the mirror housing 4 as its center, to enable the mirror housing 4 to be swung in horizontal direction (or directions shown by an arrow A in FIG. 2). An outer plate 4a which forms a base portion of the mirror housing 4 is also curved to correspond to the shape of the side of the vertical portion 2a. The mirror housing 4 which is located adjacent to the base 2 can be thus swung smoothly.

Figure 3:
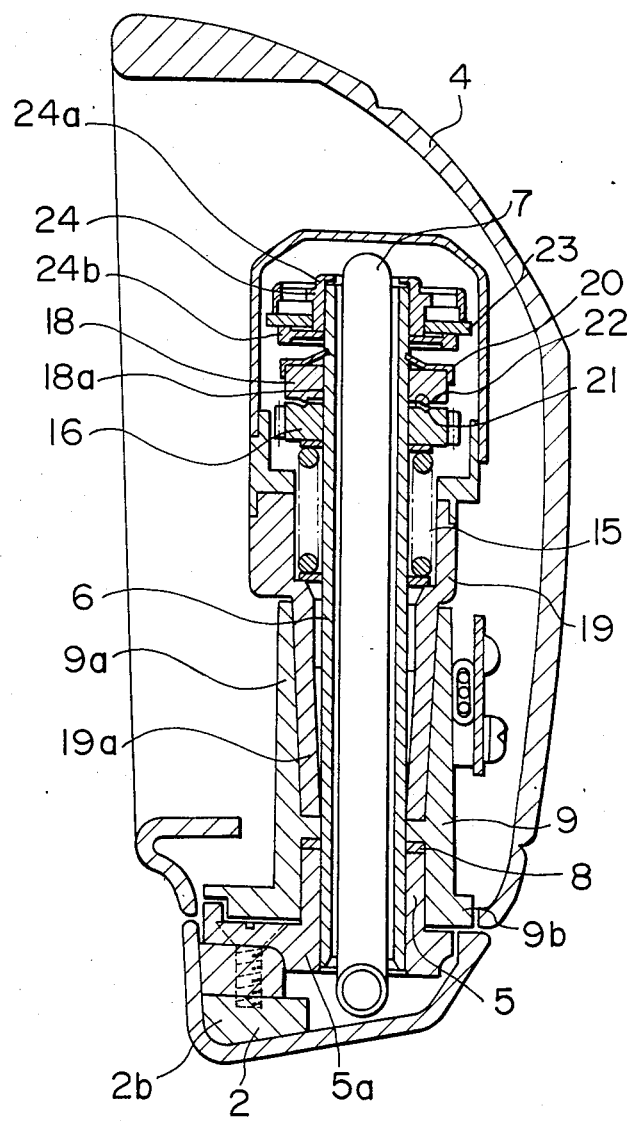
FIG. 3 is a sectional view taken along a line III—III in FIG. 1.

A fixed cylindrical shaft 6 is errected on the horizontal portion 2b of the base 2 through a shaft holder 5, as shown in FIG. 3.

The shaft holder 5 is of cylindrical shape provided with a flange portion 5a at the bottom thereof, and it is fixed in such a way that its flange portion 5a is attached to the horizontal portion 2b of the base 2 by screws.

The fixed shaft 6 is press-fitted into the shaft holder 5 at the base portion thereof and held vertical on the horizontal portion 2b of the base 2. This fixed shaft 6 is made substantially cylindrical and a cord 7 is passed through the inside of the fixed shaft 6.

A bracket is freely rotatably fitted onto the shaft holder 5 with a collar 8 interposed between them. The bracket 9 includes a second cylindrical portion 9a at the upper portion thereof and a flange portion 9b at the bottom thereof. The second cylindrical portion 9a is located round the fixed shaft 6 with a predetermined interval interposed between its inner circumference and the outer circumference of the fixed shaft 6, and the flange portion 6b is mounted on the upper face of the flange portion 5a of the shaft holder 5.

The mirror housing 4 is attached to and supported by the bracket 9 so as to swing round the fixed shaft 6.

Figure 4:
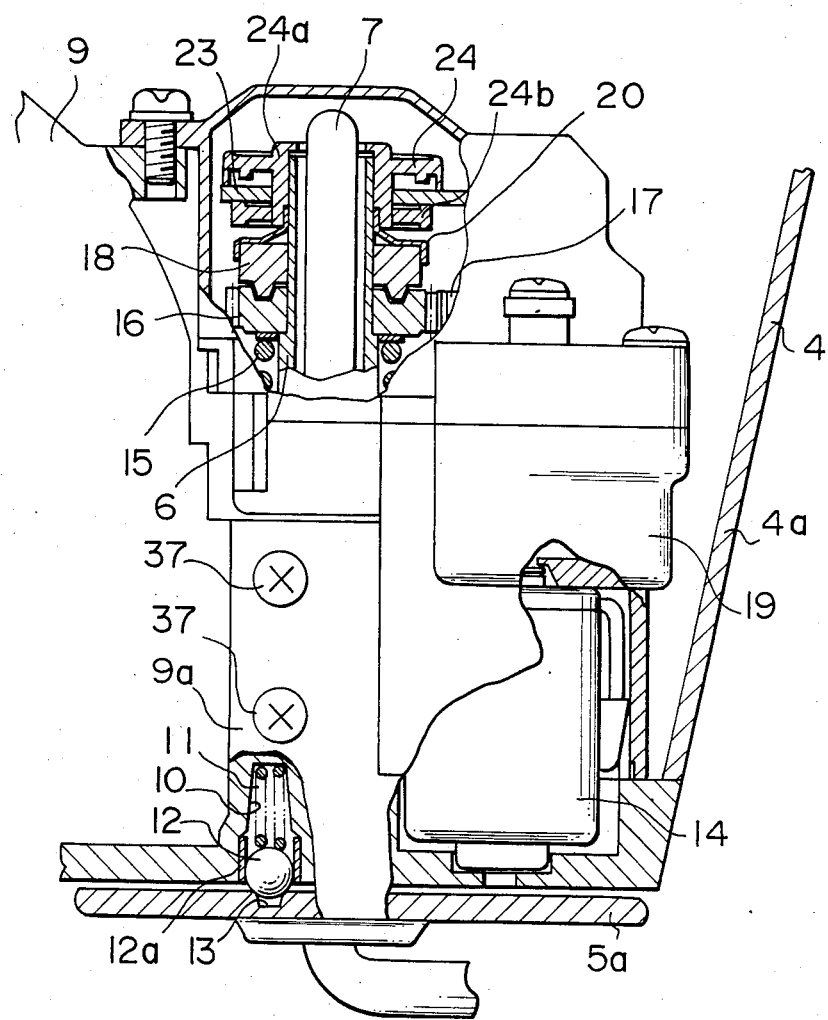
FIG. 4 is a front view, partly cut away, showing a part of a drive mechanism for use with the motor-driven collapsible door mirror shown in FIG. 1.

As shown in FIG. 4, a limiter or regulator mechanism for holding the bracket 9 at a predetermined swung position relative to the fixed shaft 6 is arranged at the bracket 9. This regulator mechanism comprises a hole 10 formed in the bottom of the cylindrical portion 9a of the bracket 9, a compression coil spring 11 housed in the hole 10, and a steel ball 12 located at the opened side of the hole 10, wherein the steel ball is urged and fitted by the compression coil spring 11 into a recess 13 formed at the top face of the flange portion 5a of the shaft holder 5. The recess 13 is formed at such a position that the steel ball 12 is fitted into it when the mirror housing 4 is at its mirror set and collapsed positions. When the mirror housing 4 is at its mirror set and collapsed positions, therefore, the steel ball 12 is fitted into the recess 13 to elastically regulate the rotation of the bracket 9. The regulator mechanism is provided at three positions along the circumference of the bracket 9, and they are interposed with good balance between the bracket 9 and the flange portion 5a of the shaft holder 5. A bush 12a for guiding the steel ball 12 is located at the opened side of the hole 10.

The drive mechanism for driving the mirror housing 4 is attached to the cylindrical portion 9a of the bracket 9.

The mirror housing drive mechanism comprises a drive motor 14, a speed reducer mechanism (not shown) associated with the drive motor 14, a sun-and-planet gear 17 engaged with a fixing gear 16 which is rotated by the drive motor 14 through the speed reducer mechanism and attached to the fixed shaft 6, and a gear case 19. The mirror housing drive mechanism is formed as a unit by incorporating its elements into the gear case 19. The drive motor 14 is located at the bottom of the gear case 19, its output shaft erected upward, to drive a group of reduction gears which are located above it and which form the speed reducer mechanism. The sun-and-planet gear 17 is located at the upper portion of the gear case 19 and rotated associating with the group of the reduction gears.

Figure 5:
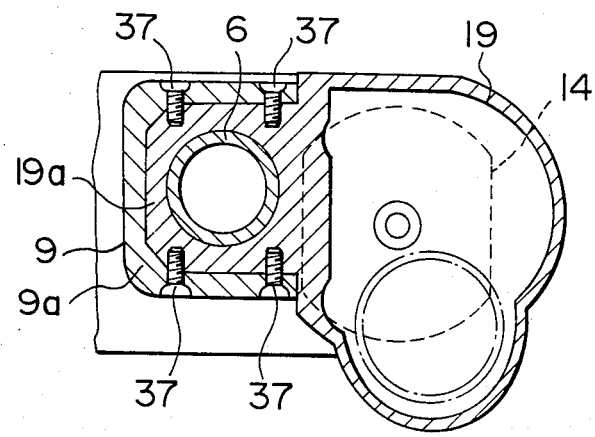
FIG. 5 is a sectional view showing how a mirror housing driving mechanism is attached.

The gear case 19 includes a cylindrical portion 19a formed parallel to the drive motor 14 and the speed reducer mechanism, as shown in FIG. 5. The cylindrical portion 19a is formed as a true circle at its inner circumference which enables the gear case 19 to be freely rotatably fitted onto the fixed shaft 6 while it is formed as a substantially rectangular shape at its outer circumference which enables the gear case 19 to be fitted into the cylindrical portion 9a of the bracket 9. The cylindrical portion 19a is sandwiched between the fixed shaft 6 and the cylindrical portion 9a of the bracket 9 and combined with the cylindrical portion 9a by screws 37. More specifically, the cylindrical portions 9a and 19a are provided with plural common bores through which the screws 37 are screwed to fasten and combine them. The gear case 19 is thus supported by the bracket 9. It may be arranged that the cylindrical portion 9a of the bracket 9 is freely rotatably fitted onto the fixed shaft 6 and that the cylindrical portion 19a of the gear case 19 is fixedly fitted onto the cylindrical portion 9a of the bracket 9. When the cylindrical portion 19a is located inside the cylindrical portion 9a and contacted with the fixed shaft 6, the cylindrical portion 9a is not inclined relative to the fixed shaft 6 and the gear case 19 can be suitably located even if it is subject to any force added from its side by the screws. In addition, the cylindrical portion 19a is sandwiched between the cylindrical portion 9a and the fixed shaft 6 to thereby hold the gear case 19 extremely stable.

The gear case 19 and the bracket 9 thus fitted onto the fixed shaft 6 are urged downward and held at an appropriate height by the elasticity of a coil spring 15 which is fitted onto the fixed shaft 6 between the gear case 19 and the fixing gear 16, as shown in FIG. 3. The sun-and-planet gear 17 is thus located at a height which corresponds to the level of the fixing gear 16 located on the side of the fixed shaft 6, and it can be therefore engaged with the gear 16.

The fixing gear 16 is fitted, freely rotatable and movable up and down, onto the fixed shaft. A disc-like engagement member 18 is also fitted onto the fixed shaft 6 above the fixing gear 16. The engagement member 18 has an attachment hole 18a whose shape is a circle cut away at its two positions and this cut-away-circle-shaped attachment hole 18a which corresponds to the outer circumference of the fixed shaft 6 prevents the engagement member 18 from being rotated round the fixed shaft 6. In addition, the engagement member 18 is defined in height by a bush nut 20 and fixed to the fixed shaft 6. The fixing gear 16 is urged toward the engagement member 18 by the elasticity of the coil spring 15 and it is engaged with the sun-and-planet gear 17 at that position where it is received by the engagement member 18.

A clutch mechanism for absorbing overload added to the transmission system of the housing drive mechanism is provided on both press-contacted faces of the fixing gear 16 and engagement member 18.

Figure 6A:
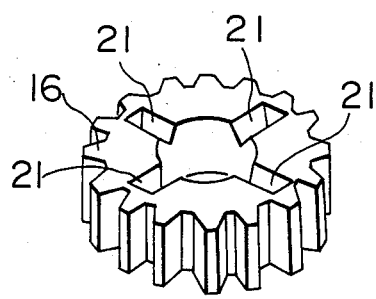
FIG. 6A is a perspective view showing a fixing gear provided with clutch grooves and located in a clutch mechanism for use with the mirror housing driving mechanism.
Figure 6B:
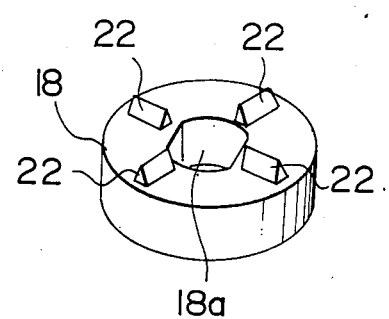
FIG. 6B is a perspective view showing the bottom side of an engagement member provided with clutch jags and located in the clutch mechanism.

The clutch mechansim includes four clutch grooves 21 formed on the top face of the fixing gear 16 and separated by 90° from each other, as shown in FIG. 6A, and four clutch jags 22 projected from the bottom face of the engagement member 18 and separated by 90° from each other, as shown in FIG. 6B, wherein each of the clutch jags 22 is engaged with and released from each of the clutch grooves 21 by the balance between the elasticity of the coil spring 15 and the load added. When the load is smaller than a predetermined value, the clutch jags 22 fit into the clutch grooves 21, respectively, to combine the fixing gear 16 with the engagement member 18. The rotation force of the sun-and-planet gear 17 driven by the drive motor 14 is thus transmitted to the fixed shaft side and the sun-and-planet gear 17 is rotated round the fixing gear 16 which is prevented from being rotated, so that the mirror housing 4 and the like can swing round the fixed shaft 6. When a large load is added from outside, the clutch jags 22 are released from the clutch grooves 21 against the coil spring 15 and the fixing gear 16 is idled relative to the fixed shaft 6, so that the mirror housing 4 and the like can be freely swung.

According to the clutch mechanism, the clutch grooves 21 are separated from each other by 90° round the fixed shaft 6 and same thing can be said about the clutch jags 22. When the fixing gear 16 which has been released from the engagement member 18 is shifted by 90° from the engagement member 18, therefore, the clutch jags 22 are again fitted into and engaged with the clutch grooves 21.

In the case of this embodiment of the present invention, each of the clutch jags 22 is wedge-shaped in section, having a vertical angle of about 60°, while each of the clutch grooves 21 is also wedge-shaped in section, having an angle of about 90°.

When any obstacle collides with the door mirror, the clutch mechanism is released to freely swing the mirror housing 4 and the like, thereby preventing the mirror housing and the like from being broken.

The clutch mechanism also enables the door mirror to be manually operated.

In the case of the door mirror as described above, the angle of the mirror housing 4 which is under usual use (or at the set position thereof) is set about 60° when it is seen from the driver's seat and about 70° when it is seen from his assistant driver's seat, in relation to the mirror collapsed position where it is collapsed backward. In a case where the clutch mechanism includes six clutch grooves and six clutch jags separated from each other by 60°, respectively, therefore, the clutch jags which have been released from the clutch grooves are engaged with each other on the way of manual operation and operation force is needed to again release the clutch jags from the clutch grooves, when the door mirror is moved from its mirror set position to its mirror collapsed position by the manual operation. In a case where the manual oepration for the door mirror is stopped on the way of its clutch jags being engaged with its clutch grooves, its return operation becomes troublesome when subsequent manual operation is to be carried out, because it is not at its appropriate position.

In a case where the clutch mechanism includes three clutch grooves and three clutch jags separated from each other by 120°, it is needed that the fixing gear 16 is rotated by about 60° to make the clutch mechanism operative, when motor-driven operation is carried out after the manual operation. This makes the operation of the clutch mechanism slow.

According to the motor-driven collapsible door mirror of the present invention, therefore, the clutch jags 21 are separated from each other by 90°, corresponding to the clutch grooves 22 also separated from each other by 90°, so that exchange from manual to motor-driven operation can be made smooth and speedy. The clutch grooves may be separated from each other by 60° or 120° and same thing can be said about the clutch jags. Although the clutch mechanism has been arranged between the fixed shaft 6 and the fixing gear 16, it may be located between the sun-and-planet gear 17 and the reduction gears or in the group of the reduction gears.

Figure 7:
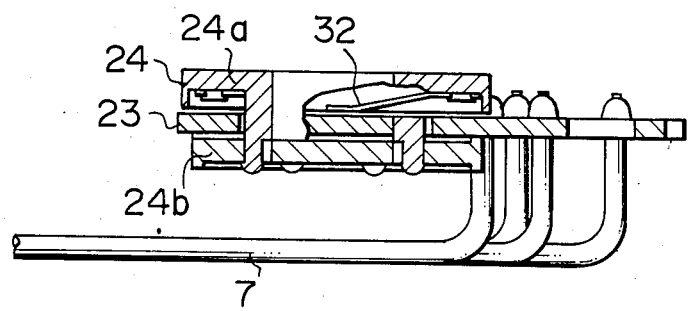
FIG. 7 is a sectional view showing a switch mechanism for detecting the swung position of the door mirror.
Figure 8:
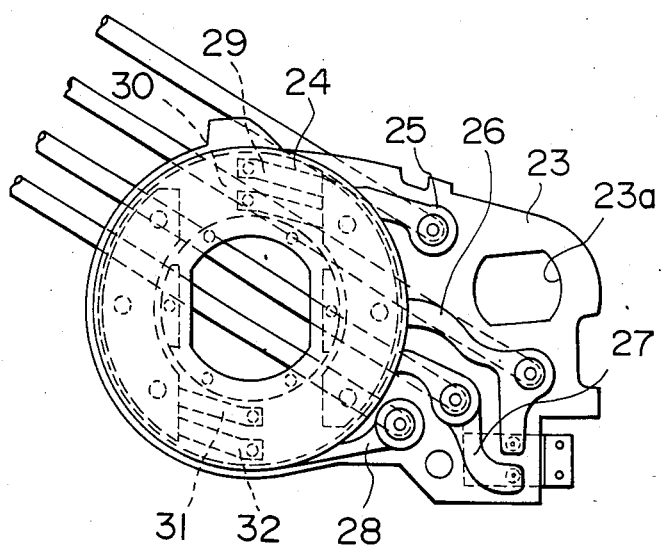
FIG. 8 is a plan showing the switch mechanism in FIG. 7.

A switch mechanism for detecting the swung position of the mirror housing 4 relative to the fixed shaft 6 is located at the top portion of the fixed shaft 6. As shown in FIGS. 7 and 8, the switch mechanism is a switch unit comprising freely rotatably incorporating a print plate 23 into a holder 24, wherein the holder 24 is fixedly fitted onto the fixed shaft 6 while a part of the print plate 23 is connected to the gear case side.

Figure 9:
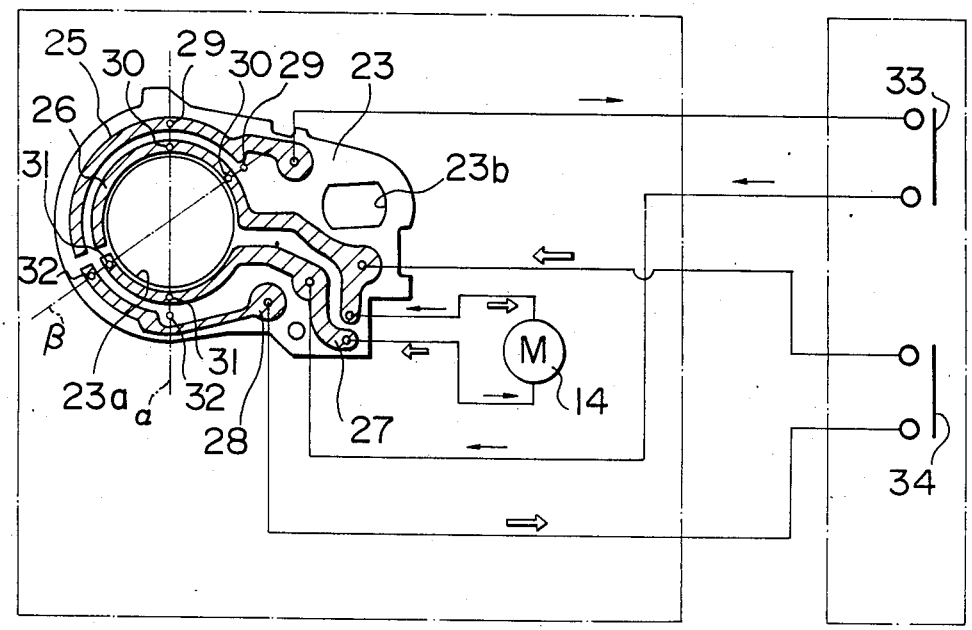
FIG. 9 is a diagram showing a pattern terminal of the switch mechanism printed on a print plate, and a circuit for driving the mirror housing.
Figure 10:
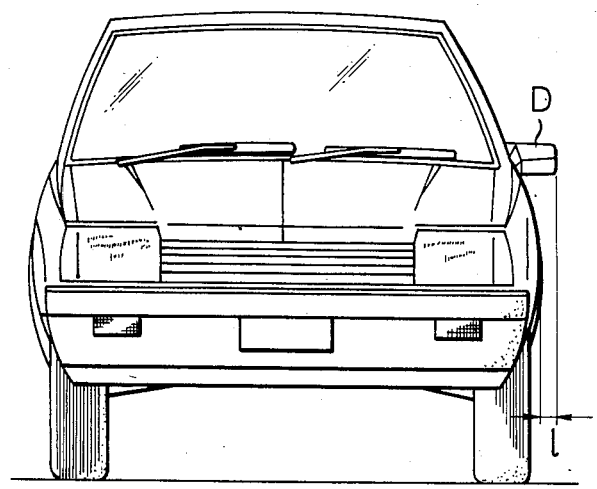
FIG. 10 is a front view showing the door mirror attached to the car body.

As shown in FIG. 9, the print plate 23 includes pattern terminals 25, 26, 27, 28 formed substantially concentric in relation to the fixed shaft 6, an opening 23a formed in the center thereof through which the fixed shaft is inserted, and an engagement bore 23b formed at one side thereof into which an engagement piece (not shown) located on the gear case side is inserted.

As shown in FIG. 7, the holder 24 is of insulating type made of synthetic resin, including upper and lower disc-shaped halves 24a and 24b which are combined integral with each other by heat seal or the like. The print plate 23 is freely rotatably held between the upper and lower halves 24a and 24b. The print plate 23 can be thus reliably insulated from the gear case 19.

As shown in FIG. 8, brush-like terminals 29, 30, 31, 32 which are contacted with and separated from the pattern terminals 25, 26, 27, 28 on the print plate 23, respectively, are arranged on the upper half 24a by insert molding. A pair of the terminals 29 and 30 of these ones 29, 30, 31, 32 are connected with each other to selectively render the pattern terminals 25 and 26 on one side of the print plate 23 operative, corresponding to the angle of the print plate 23 rotated, while another pair of the terminals 31 and 32 are also connected with each other to selectively make the pattern terminals 27 and 28 operative, corresponding to the angle of the print plate 23 rotated. In the case of this switch mechanism, therefore, the cord 7 is connected only to the print plate 23, thereby making its wiring easy. The pattern terminals 25, 26, 27, 28 and the terminals 29, 30, 31, 32 are made of alloy of copper and barium, phosphor bronze, or the like.

According to the switch mechanism having the above-described arrangement, each of the pattern terminals 25, 26, 27, 28 is connected to the mirror housing drive mechanism to switch on and off the drive motor 14, corresponding to the angle of the print plate 23 rotated or of the door mirror swung, as shown in FIG. 8. A dot-and-dash line α in FIG. 9 represents the angle of each of the terminals 29, 30, 31, 32 at the time when the door mirror is moved to its mirror set position, and another dot-and-dash line β denotes the angle of each of the terminals 29, 30, 31, 32 at the time when the door mirror is moved to its mirror collapsed position.

When a door mirror collapsing switch 33 located on the car body is operated, the drive motor 14 is made operative in its positive rotation direction through both of one-sided paired pattern terminals 25, 26 and paired terminals 29, 30 to swing the door mirror in its collapsed direction. When the door mirror is moved to its collapsed position, the pattern terminal 25 is separated from the terminal 29 to switch off the drive motor 14, thereby causing the door mirror to be stopped. The steel balls 12 of the above-mentioned regulator mechanisms are fitted into recesses 13 this time and the bracket 9 is held at the mirror collapsed position.

When a door mirror returning switch 34 is operated, the drive motor 14 is made operative in its negative rotation direction through both of another-sided paired pattern terminals 27, 28 and paired terminals 31, 32 to swing the door mirror in the door mirror set direction. When the door mirror is moved to its mirror set position, the pattern terminal 28 is separated from the terminal 32 to switch off the drive motor 14, thereby causing the door mirror to be stopped. The steel balls 12 of the regulator mechanisms are also fitted into the recesses 13 this time and the bracket 9 is held at the mirror set position.

The door mirror can be thus swung by operating one of the switches 33 and 34.

Although the present invention has been described above in detail with reference to a preferred embodiment thereof, it should be understood that various changes and modifications can be made without departing from the spirit and scope of the present invention.

We claim:

1. A motor-driven collapsible door mirror comprising:
   a base fixed to a door of a car;
   a fixed shaft attached to the base;
   a mirror housing supported, rotatable round the fixed shaft, to hold a mirror adjustable;
   a drive motor housed, parallel to the fixed shaft, in the mirror housing;
   a speed reducer mechanism housed, serial to the drive motor and parallel to the fixed shaft, in the mirror housing;
   a system for transmitting a power of the drive motor through the speed reducer mechanism to the mirror housing;
   a means provided in the power transmission system for absorbing overload added thereto;
   a fixed gear attached to the fixed shaft and included in the power transmission system;
   a bracket provided on the mirror housing, and having a cylindrical portion through which the fixed shaft is inserted and a holder member for the speed reducer mechanism is attached to the cylindrical portion of the bracket; and
   a switch mechanism provided on a top portion of the fixed shaft for detecting a predetermined position of the mirror housing rotated.

2. A motor-driven collapsible door mirror according to claim 1 wherein the speed reducer mechanism includes a group of reduction gears.

3. A motor-driven collapsible door mirror according to claim 1 wherein the holder member for the speed reducer mechanism is provided with a cylindrical portion which is fitted, freely rotatable, onto the fixed shaft and onto which the cylindrical portion of the bracket is fixedly fitted.

4. A motor-driven collapsible door mirror according to claim 1 wherein the cylindrical portion of the bracket is fitted, freely rotatable, onto the fixed shaft, and the cylindrical portion of the holder member for the speed reducer mechanism is fixedly fitted onto the cylindrical portion of the bracket.

5. A motor-driven collapsible door mirror according to claim 1 wherein the means for absorbing the overload is located between the fixed shaft and the fixing gear to shut off the fixing gear from the fixed shaft depending upon the overload added.

6. A motor-driven collapsible door mirror according to claim 1 wherein the means for absorbing the overload is located between the speed reducer mechanism and the sun-and-planet gear or in the speed reducer mechanism.

7. A motor-driven collapsible door mirror according to claim 5 wherein the means for absorbing the overload is made operative every time when the mirror housing is rotated by a quarter relative to the fixed shafr.

8. A motor-driven collapsible door mirror according to claim 5 wherein the means for absorbing the overload is made operative every time when the mirror housing is rotated by a sixth relative to the fixed shaft.

9. A motor-driven collapsible door mirror according to claim 5 wherein the means for absorbing the overload is made operative every time when the mirror housing is rotated by a third relative to the fixed shaft.

10. A motor-driven collapsible door mirror according to claim 1 wherein the switch mechanism includes a print plate on which pattern terminals are formed, and an insulating holder for holding the print plate freely rotatable, said insulating holder being provided with terminals which are contacted with and released from the pattern terminals, corresponding to the angle of the print plate rotated, and wherein the insulating holder is attached to the fixed shaft while the print plate is connected to the mirror housing side.

11. A motor-driven collapsible door mirror according to claim 1 further including a limiter or regulator mechanism for elastically defining the rotation of the mirror housing at mirror set and collapsed positions.

12. A motor-driven collapsible door mirror according to claim 11 wherein the limiter or regulator mechanism includes a steel ball urged by a coil spring located on the housing side, and a recess which is provided on the base side and into which the steel ball can be fitted.

* * * * *